July 20, 1948. K. D. WEAVIE 2,445,651

FLASHLIGHT MOVIE PROJECTOR

Filed April 24, 1947

INVENTOR.
Karl D. Weavie
BY Louis Chayka
ATTORNEY

Patented July 20, 1948

2,445,651

UNITED STATES PATENT OFFICE 2,445,651

FLASHLIGHT MOVIE PROJECTOR

Karl D. Weavie, Saline, Mich., assignor of one-half to Stephen L. Platkowski, Ann Arbor, Mich.

Application April 24, 1947, Serial No. 743,707

3 Claims. (Cl. 88—18.8)

1

My improvement pertains to portable self-contained projectors by means of which a series of separate transparencies arranged in a circle may be illuminated for projection in a rapid sequence to create the illusion of a continuous motion.

As the transparencies are arranged upon a rotary circular support, the same illusory movement of limited scope like the jumping of a dog, the flight of a bird or a movement of some person may be repeated over and over again in a continuity that would especially appeal to children.

The object of my improvement is to provide a device of this kind in which a series of transparencies may be easily replaced, the device being both educational and entertaining in character. A further purpose of my improvement is to provide a device that has the above advantages but includes a simple structural design and may be manufactured at low cost.

My specific purpose is to provide a projector of the kind described of which a flashlight may be used as a source of illumination thus dispensing with the need of cables, plugs and socket connections to the household electric wiring system.

I shall now describe my improvement with reference to the accompanying drawings in which.

Similar numerals refer to similar parts throughout the several views.

Figures 1, 2, 3, 4:
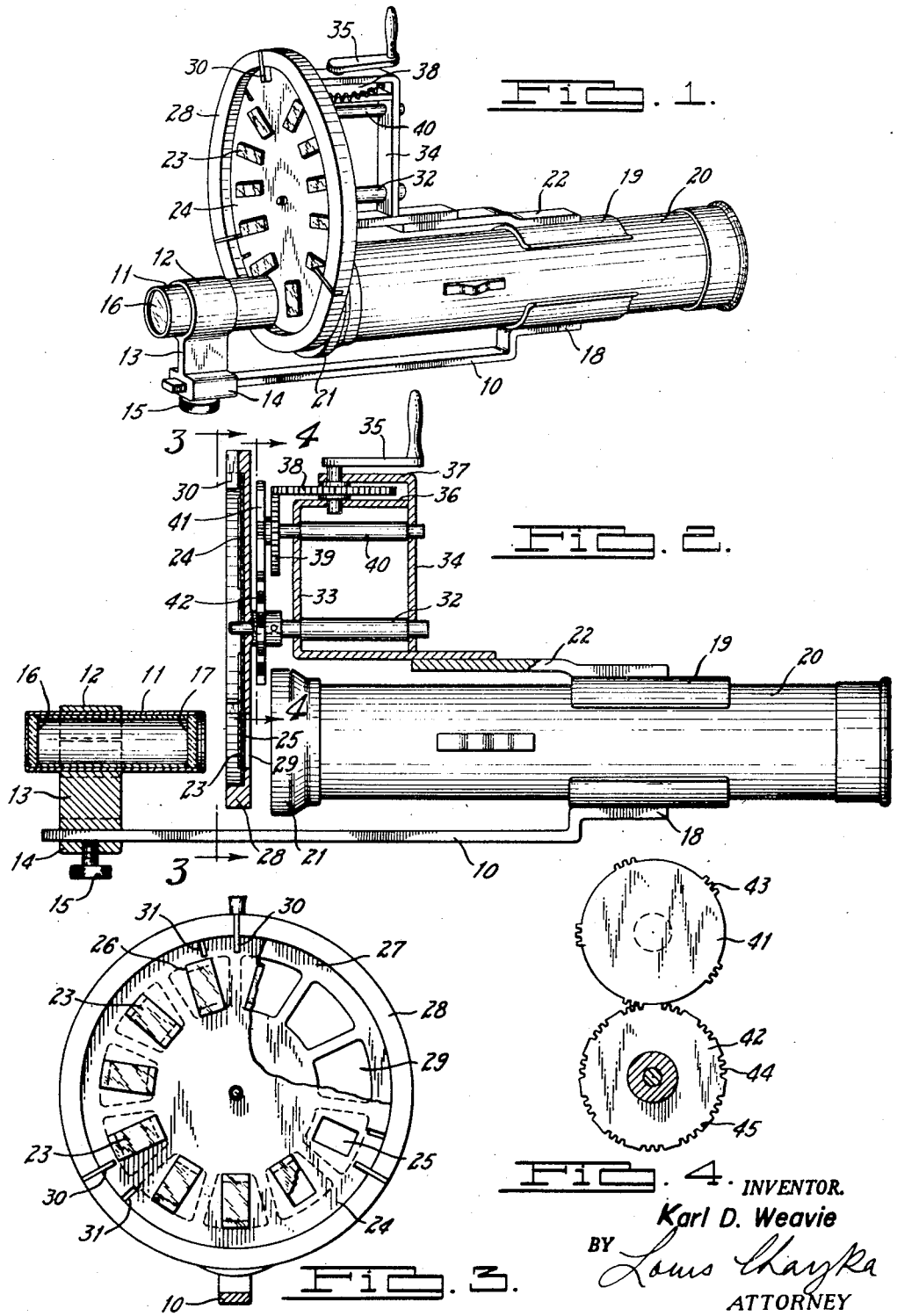
Figure 1 is a perspective view of my projector.
Figure 2 is a longitudinal sectional view of my projector with some parts shown in side elevation.
Figure 3 is a sectional view on line 3—3 of Figure 2.
Figure 4 is a sectional view on line 4—4 of Figure 2.

The projector includes what may be called a framework upon which the respective elements of said projector are mounted. A part of said framework is formed by a normally horizontally disposed bar 10, the front end of which serves as a support for a lens barrel 11. The barrel having therein projecting lenses 16 and 17, respectively, is disposed within a cylindrical sleeve 12 resting on a bracket 13. The latter includes a base 14 slotted internally for a sliding longitudinal movement of said bar 10. An adjusting screw 15 threaded from below into the base, as shown in Figure 2, bears against the bar and serves as a means of preventing any longitudinal movement of the lens barrel, once the focus of the lens has been set with respect to the transparencies to be projected.

At the opposite end, at 18, said bar supports a split sleeve 19, which, diametrically, is large enough to accommodate the cylindrical shell of a flashlight 20. The front portion 21 of said flashlight including a reflector and a light bulb which are not shown, is spaced from the lens barrel 11 but is axially alined with lenses 16 and 17 within said barrel. Welded to said split sleeve 19 in a parallel but a diametrically opposed relation to bar 10, is a plate 22. This serves as a support of a mechanism including a holder for a disk carrying said transparencies, and further including means to rotate said holder.

The transparencies 23 comprise single frames of a positively developed photographic film, the frames being such as are included in a length of a film exposed in a movie camera and suitably developed. Said frames are cemented in place upon a disk, preferably a cardboard disk, having a plurality of radially disposed rectangular apertures. The frames, it will be noted, have marginal portions affording a space for application of a cement or some other suitable adhesive substance.

The cardboard disk 24 with the transparencies thereon is held within a circular metal holder 27 made in the shape of a wheel having a flat central portion and a rim portion 28 extending outwardly in the direction of the axis of the wheel, said rim forming a marginal shoulder as best shown in Figure 1. The space within the confines of the rim is large enough to receive said disk 24.

The flat central space in the holder is provided with a plurality of windows 29 arranged in a circle, the number of such windows corresponding to the number of transparencies in the disk. It will be understood that each transparency, when the disk 24 is inserted into said holder, will be in register with a window. To insure this relative arrangement, I have provided the holder with a plurality of radial lugs 30 each of which fits into a radially disposed slot 31 in the marginal portion of the disk.

The holder is axially mounted on a shaft 32, journalled in an up-right standard composed of a U-shaped member 33 resting on one of its side legs on plate 22 and closed on its open side by an up-right bar 34. The rotation of the holder is accomplished by means of a crank 35 journalled in leg 36 of the above named U-shaped member 33 and in the extension 37 of bar 34. Said extension is turned at top of bar 34 parallel to leg 36. A gear wheel 37 mounted on said crank 35 is meshed with a pinion 39 keyed to a shaft 40. The latter is journalled in the manner of shaft 32 in said U-shaped member 33 and in the up-right bar 34.

In rotating the holder 27 for the purpose of creating a simulated motion of images as above described, it is necessary to have each transparency detained momentarily in position in front of the flashlight and back of the lens barrel 11. This is done by means of special gear wheels 41 and 42, the first of which is mounted on shaft 41 in an axial relation to pinion 39, and the second of which is mounted on shaft 32 back of holder 27 in an axial relation thereto. By reason of the intermittent placement of teeth 43 on gear wheel 41, and by reason of a corresponding formation of teeth 44, separated by sliding spaces 45, on wheel 42, the rotation of the crank will cause intermittent rotation of holder 27 containing disk 24 with transparencies thereon.

The projector, it may be pointed out, is small and light in weight, and the split sleeve which holds the flashlight serves as a convenient handle so that the device may be carried by a child and the pictures may be projected upon any convenient surface.

The manner in which the projector may be used is quite obvious. Assuming that the flashlight 20 is in place within the split sleeve 19, a disk carrying transparencies is inserted into holder 27. One of the transparencies will be in front of the light bulb within the flashlight. If the light is switched on said light passes through the transparency into the lens barrel longitudinally for a sharp projection of the image on the transparency on a screen, a wall or other suitable flat area. Thereupon, by rotation of the crank 35 other transparencies will be brought one by one in front of the flashlight in rapid sequence to create an illusion of motion.

Having described my improvement, what I wish to claim is as follows:

1. A projector of the kind described including a split sleeve, a flashlight held therein and having a light bulb at one end thereof, a horizontal bar connected to and extending forwardly of the lower portion of the sleeve, a lens barrel mounted on said bar and axially aligned with a flashlight to the front of the light bulb, a vertical bracket on top of the sleeve, a horizontal shaft journalled in the bracket, a circular holder axially mounted on said shaft for rotation therewith, in a vertical plane, between the lens barrel and the flashlight, said holder including a flat central surface with a plurality of radially disposed windows therein and an annular shoulder on the rim portion of the holder, a disk fitting within the annular shoulder and having a plurality of radially disposed apertures in register with said windows, an image carrying transparency over each aperture, the outer portion of the holder on the annular line of the windows being disposed between the light bulb and the lens barrel, and crank and gear means to impart to the shaft and the holder an intermittent rotary motion to bring the transparencies, one by one, into alinement with the light bulb and the lens barrel.

2. A projector of the kind described comprising a split sleeve serving as a handle, a flashlight within the sleeve and having a light bulb at one end, a bar extending forwardly from the lower surface of the sleeve, a lens barrel slidingly mounted on the bar, and in axial alinement with the flashlight to the front of the light bulb, a bracket on the upper surface of the sleeve, a flat circular holder keyed to a shaft mounted within the bracket for rotation of the holder in a plane between the light bulb and the lens barrel, the outer portion of the holder being provided with a plurality of radially disposed windows in a circular arrangement therein, a disk fitting into the holder and having a plurality of transparencies in an annular arrangement and in register with the windows, and crank and gear means to impart to the holder an intermittent rotary motion to bring the transparencies, one by one in front of the light bulb.

3. A projector of the kind described including a cylindrical, split sleeve forming a handle, a flashlight within the sleeve and having a light bulb at one end, a horizontal bar connected to and extending forwardly of the sleeve, a lens barrel in axial alignment with the flashlight to the front of the light bulb, a bracket extending radially from the split sleeve, a shaft journalled within the bracket parallel to the sleeve, a circular holder, axially mounted on the shaft for rotation therewith, in a plane between the light bulb and the lens barrel, said holder having an annular flange along its rim and being provided with a plurality of windows in an annular arrangement around its axis, a disc axially disposed within the holder, said disc carrying a plurality of transparencies arranged in a circle and being in register with said windows, and crank-and-gear means mounted upon said bracket to impart to the circular holder a rotary motion to bring the transparencies, one by one, in front of the light bulb.

KARL D. WEAVIE.

REFERENCES CITED

The following references are of record in the file of this patent:

UNITED STATES PATENTS

| Number | Name | Date |
| --- | --- | --- |
| 1,019,932 | Victor | Mar. 12, 1912 |
| 1,102,735 | Goddard | July 7, 1914 |
| 1,110,247 | Whitehead | Sept. 8, 1914 |
| 1,235,997 | Mottlau | Aug. 7, 1917 |
| 1,965,688 | Chase | July 10, 1934 |
| 2,090,086 | Weiner | Aug. 17, 1937 |